United States Patent [19]

Cummings et al.

[11] Patent Number: 5,162,084
[45] Date of Patent: Nov. 10, 1992

[54] PROCESS FOR MONITORING AND CONTROLLING AN ALKANOLAMINE REACTION PROCESS

[75] Inventors: Arthur L. Cummings, Ponca City; Fred C. Veatch, Newkirk; Alfred E. Keller; James C. Thompsen, both of Ponca City, all of Okla.; Regina A. Severson, Houston, Tex.

[73] Assignee: Conoco Inc., Ponca City, Okla.

[21] Appl. No.: 773,387

[22] Filed: Oct. 8, 1991

[51] Int. Cl.$^5$ .............................. B01J 47/14
[52] U.S. Cl. .......................... 210/662; 210/670; 210/683; 210/746; 423/229; 423/DIG. 14
[58] Field of Search .............. 210/96.1, 746, 670, 210/673, 682, 683, 685, 662; 423/228, 229, 236, 243, DIG. 14; 514/26

[56] References Cited

U.S. PATENT DOCUMENTS

| | | | |
|---|---|---|---|
| 2,628,191 | 2/1948 | Sard | 210/746 |
| 2,797,188 | 6/1957 | Taylor et al. | 423/228 |
| 2,938,868 | 5/1960 | Carlson et al. | 210/662 |
| 3,246,759 | 4/1963 | Matalon | 210/746 |
| 3,531,252 | 10/1966 | Rivers | 210/746 |
| 4,199,323 | 4/1980 | Miller et al. | 210/96.1 |
| 4,242,097 | 12/1980 | Rich et al. | 210/96.1 |
| 4,320,206 | 3/1982 | Konen | 521/26 |
| 4,383,046 | 5/1983 | Emmett | 521/26 |
| 4,477,419 | 10/1984 | Pearce et al. | 423/228 |
| 4,795,565 | 1/1989 | Yan | 210/685 |
| 4,814,281 | 3/1989 | Byers | 210/96.1 |
| 4,880,513 | 11/1989 | Davis et al. | 210/746 |
| 4,952,386 | 8/1990 | Davison et al. | 210/685 |
| 4,970,344 | 11/1990 | Keller | 423/229 |
| 5,006,258 | 4/1991 | Veatch et al. | 521/26 |

FOREIGN PATENT DOCUMENTS

| | | | |
|---|---|---|---|
| 2167816 | 6/1990 | Japan | 210/746 |
| 446289 | 4/1975 | U.S.S.R. | 210/96.1 |

OTHER PUBLICATIONS

Publication, "Hydrocarbon Processing"—Mar. 1982 Issue, —Alkanoloamine Treating, K. F. Butwell et al.

Primary Examiner—Robert A. Dawson
Assistant Examiner—Joseph Drodge

[57] ABSTRACT

Monitoring and controlling the reactivation of an alkanolamine solution containing heat-stable salts of such alkanolamine with stronger acid anions and weaker acid anions by contacting the alkanolamine solution (a) with a strong base anion exchange resin which has a high affinity for stronger acid anions (b) contacting the effluent alkanolamine solution from the strong base anion exchange resin with a second strong base anion exchange resin which has an affinity for weaker acid anions (c) measuring and recording the electrical conductance of the effluent solution from the first mentioned anion exchange resin (d) removing the first mentioned anion exchange resin from service when the conductance of the effluent alkanolamine solution from said resin indicates breakthrough of stronger acid anions in said effluent, (e) measuring and recording the electrical conductance of the effluent alkanolamine solution from the second mentioned anion exchange resin (f) removing the second mentioned anion exchange resin from service when the conductance of the effluent alkanolamine solution from said resin indicates break through of weaker acid anions in said effluent and (g) regenerating the strong base anion exchange resins.

33 Claims, 6 Drawing Sheets

PROCESS FOR MONITORING AND CONTROLLING AN ALKANOLAMINE REACTION PROCESS

BACKGROUND OF THE INVENTION

Alkanolamine sweetening units are used for the removal of $H_2S$ and $CO_2$ from natural gases, enhanced oil recovery gases, refinery hydrodesulfurizer recycle gases, FCCU and Coker gas plant tail gases, LPG streams, and Claus sulfur recovery tail gases. The alkanolamines (AAmines) commonly used are ethanolamine, diethanolamine, methyl diethanolamine, diisopropanol amine, and triethanol amine. These compounds are weak bases in aqueous solution. When solutions of alkanolamines are contacted in packed, sieve plate, bubble cap, or valve tray columns with streams containing $H_2S$ and $CO_2$, the $H_2S$ and $CO_2$ dissolve into the alkanolamine solution. The following chemical reactions then take place:

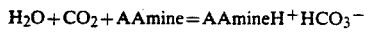

General Eqn.: Acid Gases + Alkanolamine = Alkanolamine Salts of Acid Gases

The solution of water, unreacted alkanolamine, and alkanolamine salts is subjected to stream stripping to reverse the above reaction and remove $H_2S$ and $CO_2$ from the alkanolamine. The $H_2S$ and $CO_2$ removed from the alkanolamine can then be processed by Claus sulfur recovery, incineration, fertilizer manufacture, or other means.

$H_2S$ and $CO_2$ are not the only gases in the above referred to streams which form weak acids when dissolved in water. Other such acid gases, as they are commonly called, that may appear in gas streams treated with alkanolamine include $SO_2$, COS, or HCN. These gases also undergo the same reactions as $H_2S$ and $CO_2$ to form alkanolamine salts. These salts, however, cannot be removed by steam stripping as are $H_2S$ and $CO_2$ salts. Thus, they remain and accumulate in the system.

Another problem is presented if oxygen gets into the alkanolamine system. Oxidation of acid gas conjugate base anions leads to the formation of other alkanolamine salts, most commonly salts of thiosulfate $S_2O_3^=$ and sulfate $SO_4^=$. Alkanolamine salts are also formed with thiocyanate $SCN^-$ and chloride $Cl^-$. These salts also cannot be regenerated by steam stripping.

In addition to the inorganic anions, the alkanolamine solution may also be contaminated with organic anions such as anions of formic acid ($HCO_2^-$) and acetic acid ($CH_3CO_2^-$) and the like.

Alkanolamine salts which cannot be heat regenerated, called heat-stable salts, reduce the effectiveness of alkanolamine treating. The alkanolamine is protonated and cannot react with $H_2S$ and $CO_2$, which dissolve into the solution. Also, accumulated alkanolamine salts are known to cause corrosion in carbon steel equipment which is normally used in amine systems. These salts are also known to cause foaming problems which further decreases treating capacity.

One procedure used to deprotonate the alkanolamine so it can react with $H_2S$ and $CO_2$ is to add an alkali metal hydroxide such as NaOH to the amine solution. The deprotonated alkanolamine can then be returned to $H_2S$ and $CO_2$ removal service. However, the sodium salts of the anions of the heat-stable salts are also heat stable, and are difficult to remove, and thus accumulate in the alkanolamine solution with attendant corrosion and foaming problems.

The alkanolamine solution containing alkali metal salts of anions which form heat-stable salts with such alkanolamine may be reactivated by contacting it with a cation exchange resin whereby alkali metal ions are removed from the solution. Thereafter, the cation exchange resin is regenerated with a dilute mineral acid.

The remaining alkanolamine solution still contains the anions such as thiocyanate which form heat stable salts with the alkanolamine. One process which is very effective in accomplishing the removal of thiocyanate and other anions is disclosed in copending patent application Ser. No. 07/693,837, filed May 10, 1991, which is hereby incorporated by reference.

In Ser. No. 07/693,837, an alkanolamine solution containing thiocyanate anions and other anions which form heat stable salts with such alkanolamine is reactivated by contacting the alkanolamine solution with a strong base anion exchange resin having a high affinity for thiocyanate anions as compared to the other anions, contacting the effluent solution from the aforesaid strong base anion exchange resin with a strong base anion exchange resin which has an affinity for the other anions, thereafter regenerating the first mentioned strong base anion exchange resin by contacting it with sulfuric acid to effect removal of thiocyanate anions followed by contacting said resin with alkali metal hydroxide to remove sulfate anions and thereafter regenerating the second mentioned strong base anion exchange resin by contacting it with an alkali metal hydroxide to remove the other anions.

It is also disclosed in Ser. No. 07/693,837 that when the alkanolamine solution contains heat-stable alkali metal salts of thiocyanate and other anions, the cation exchange resin may be regenerated by first contacting it with aqueous ammonia to preferentially displace alkanolamine from the resin without displacing alkali metal cations and thereafter the resin is contacted with a dilute mineral acid to displace the ammonia, metal cations, and any remaining alkanolamine. Regeneration of the two anion exchange resins is then carried out in the same manner as described above.

It is apparent that conjugate base anions of acids are present during various stages of the alkanolamine treating process and also during the procedures carried out to reclaim spent alkanolamine. It would be desirable to have a process for determining the concentration and type of anions present in the alkanolamine solution at various stages of the treating process to reduce costs associated with under circulation, high corrositivity and poor treating of amine streams. It would also be desirable to monitor and control alkanolamine reactivation processes in which anions are removed from the alkanolamine.

THE PRIOR ART

U.S. Pat. No. 2,628,191 to Sard discloses a method for determining when a cation exchanger has become exhausted which comprises measuring electrical conductivity of the effluent from the resin bed and comparing that measurement against the conductivity trace of a portion of effluent which is passed through a different quantity of exchange material, such as a small auxiliary ion exchanger for testing.

U.S. Pat. No. 3,246,759 to Matalon discloses means for measuring the conductivity of a solution downstream of a resin bed for controlling the regeneration of an ion exchange bed.

U.S. Pat. No. 3,531,252 to Rivers discloses a method of analyzing conductive solutions wherein the ionic constituent concentration of a sample is determined by: taking a first conductivity reading thereof; adding a reagent such that a substantial excess beyond the point of neutralization will not affect the conductivity of the solution and capable of reacting with said substituent in an amount of excess of that necessary for reaction; taking a second conductivity measurement; comparing the conductivities against a conductivity trace of known concentration of said constituent reaction with known quantities of reagent.

U.S. Pat. No. 4,199,323 to Miller et al. provides an example of differential conductivity detection combined with ion exchange derivitization.

U.S. Pat. No. 4,242,097 to Rich et al. discloses a system wherein a conductivity cell and its associated readout are provided for effluent detection of a solution which has been passed through an ion exchange column.

U.S. Pat. No. 4,814,281 to Byers discloses a monitoring system wherein conductivities of a solution are taken before and after passing a solution through an ion exchange column, and the differential conductivity is used to calculate sulfate concentration in accordance with a known relationship between a conductivity differential and sulfate concentration of a fluid sample.

U.S. Pat. No. 4,880,513 to Davis et al. discloses a conductivity monitor which detects concentration of a circulation salt, while a second monitor detects concentrations of acid/base solutions which are utilized to regenerate exhausted ion exchange resins.

THE INVENTION

The invention relates to a process for monitoring and controlling the reactivation of an alkanolamine solution containing heat-stable salts of such alkanolamine with stronger acid anions and weaker acid anions. The alkanolamine solution is (a) contacted with a strong base anion exchange resin which has a high affinity for stronger acid anions (b) effluent alkanolamine solution from the strong base anion exchange resin is contacted with a second strong base anion exchange resin which has an affinity for weaker acid anions (c) the electrical conductance of the effluent solution from the first mentioned anion exchange resin is measured and recorded (d) the first mentioned anion exchange resin is removed from service when the conductance of the effluent alkanolamine solution from said resin indicates breakthrough of stronger acid anions in said effluent, (e) the electrical conductance of the effluent alkanolamine solution from the second mentioned anion exchange resin is measured and recorded (f) the second mentioned anion exchange resin is removed from service when the conductance of the effluent alkanolamine solution from said resin indicates breakthrough of weaker acid anions in said effluent and (g) the strong base anion exchange resins are regenerated.

In one aspect of the invention, thiocyanate anions are preferably removed from the alkanolamine solution in the first mentioned strong base anion exchange resin and other anions present in the alkanolamine solution are removed in the second mentioned strong base anion exchange resin.

In still another aspect of the invention, the alkanolamine solution to be reactivated contains heat stable alkali metal salts of stronger and weaker acid anions. In this aspect, the alkanolamine solution is first contacted with a cation exchange resin to remove alkali metal cations from the solution and the effluent from the cation exchange resin is contacted sequentially with the two strong base anion exchange resins as described above.

In yet another aspect of the invention where the alkanolamine solution contains heat-stable alkali metal salts of stronger and weaker acid anions, the cation exchange resin is regenerated by first contacting it with aqueous ammonia to preferentially displace alkanolamine from the resin without displacing alkali metal cations and thereafter contacting the resin with a dilute mineral acid to displace the ammonium cations and any remaining alkanolamine. Regeneration of the two strong base anion exchange resins is carried out in the same manner as described above.

DETAILED DESCRIPTION OF THE INVENTION

Figure 1:
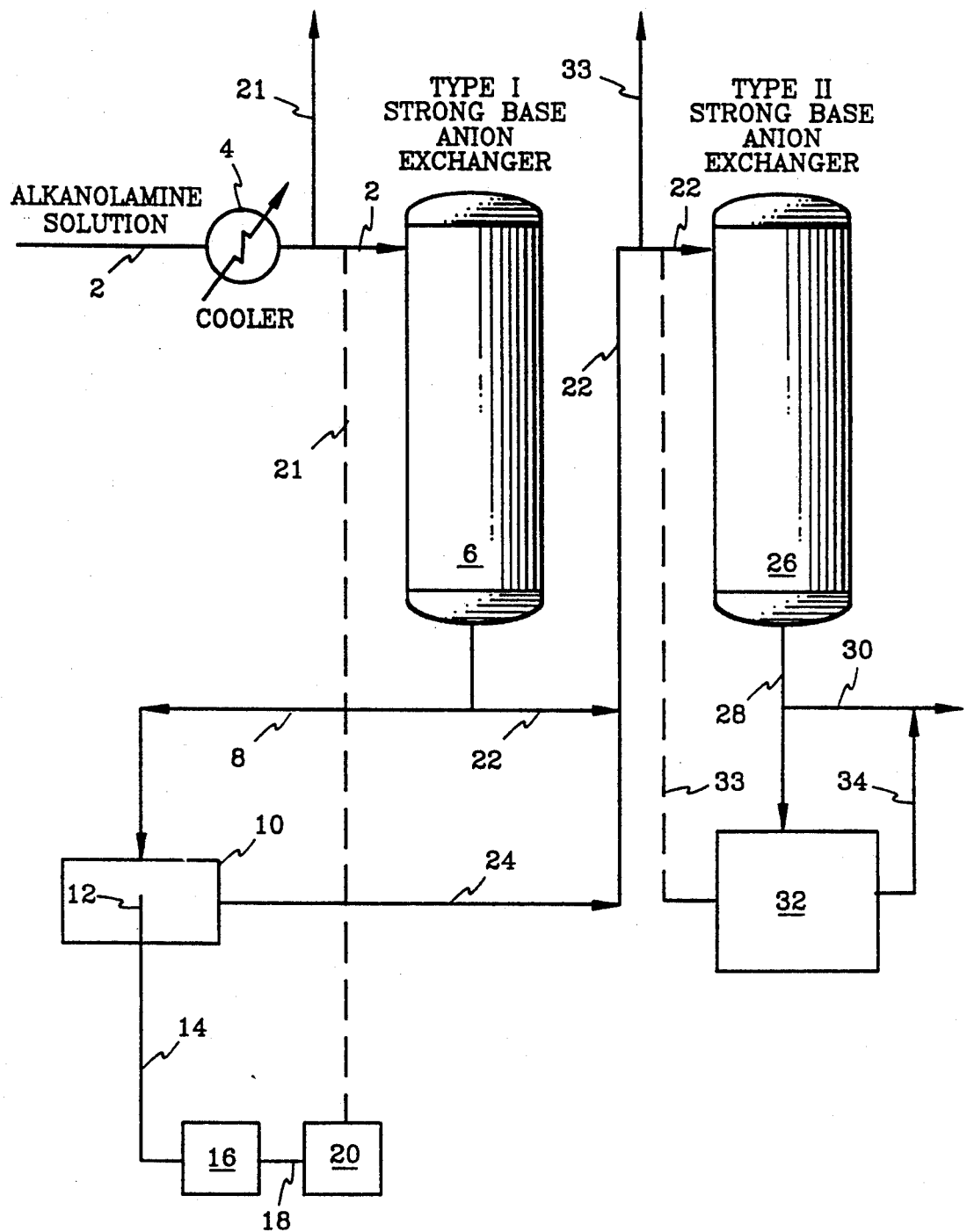
FIG. 1 is a schematic process flow diagram which illustrates one embodiment of the process of the invention in which alkanolamine solution is passed sequentially through two strong base anion exchange resins.

Each anion found in the amine solutions has a conductance which generally differs from the conductance of the other anions. The same holds true for cations such as $Na^+$. Equivalent conductances in aqueous solutions at 25° C. for the anions and cations of interest are set forth in the table.

TABLE

| ION | EQUIVALENT CONDUCTANCE SIEMENS |
|---|---|
| • $Na^+$ | 50 |
| $Cl^-$ | 76 |
| $\frac{1}{2} SO_4^=$ | 80 |
| $HCOO^-$ | 54 |
| $CH_3COO^-$ | 41 |
| $SCN^-$ | 65 |
| $MDEAH^+$ | 30 |

| TABLE-continued | |
| --- | --- |
| ION | EQUIVALENT CONDUCTANCE SIEMENS |
| OH⁻ | 199 |

The process of the invention may be used to monitor and control the reactivation of any aqueous alkanolamine solution which contains anions which form heat stable salts with such alkanolamines. Such anions may be present in the form of alkali metal salts and/or alkanolamine salts. As previously pointed out, such alkanolamine solutions may result from processes in which hydrocarbon gases are contacted with an aqueous alkanolamine solution to absorb from said gases such impurities as $H_2S$ and $CO_2$. The resulting solutions which contain alkanolamine salts of $H_2S$ and $CO_2$ also may contain salts of various inorganic and organic anions which are present in the hydrocarbon gases or are formed in the solution by oxidation resulting from oxygen entering the alkanolamine treating system, such as those listed in the Table. The alkanolamine salts may be converted to alkali metal salts by introducing an alkali metal hydroxide to the alkanolamine solution. Any alkali metal hydroxide may be used for this purpose such as potassium hydroxide or lithium hydroxide; however, for economic reasons, sodium hydroxide is preferred.

The process of the invention is directed to the monitoring and control of the reactivation of an alkanolamine solution containing stronger and weaker acid anions by the use of strong base anion exchange resins. Stronger acid anions are anions which have an acid dissociation constant greater than about $10^{-2}$. Of the anions usually present in the reactivation of alkanolamine solutions the stronger acid anions are the thiocyanate, chloride and sulfate anions. The solution to be reactivated usually contains only small amounts of chloride and sulfate anions. Thus, the major stronger acid anion present is the thiocyanate anion. Even when chloride and sulfate anions are present, their quantity is substantially less than the thiocyanate anion.

The other anions present in the alkanolamine solution to be reactivated are the weaker acid anions which include the acid gases and acid anions such as sulfur dioxide, carbonyl sulfide, hydrogen cyanide, thiosulfate, formate and acetate.

In carrying out the process of the invention, the alkanolamine solution containing stronger and weaker acid anions is sequentially contacted with two strong base anion exchange resins. The stronger acid anions are preferentially removed in the first strong base anion exchange resin and the weaker acid anions are subsequently removed from the alkanolamine solution in the second anion exchange resin. The first anion exchange resin is also effective in removing the weaker acid anions as well as the stronger acid anions. However, the anion exchange resin has such a high affinity for the stronger acid anions, in particular the thiocyanate anions, that these anions displace any weaker acid anions from the exchange resin. In turn, the thiocyanate anion having a higher affinity for the exchange resin than the chloride and sulfate anions will also tend to displace these anions from the first anion exchange resin.

The alkanolamine solution leaving the first strong base anion exchange resin which is essentially free of thiocyanate anions is then contacted with the second strong base anion exchange resin to remove the remaining anions from the alkanolamine solution. Contact of the alkanolamine solution sequentially with the two strong base anion exchange resins is continued until the resins are spent and are ready for regeneration. To determine the appropriate times for regeneration of the anion exchange resins, the effluents from the resins are passed in contact with conductance probes and the output from the probes is measured and charted and used to monitor and control reactivation of the alkanolamine solution.

The procedures employed in the process of the invention are best described by reference to the drawings.

Referring first to FIG. 1, the feed to the unit is a warm, alkanolamine solution containing heat-stable salts of various stronger and weaker acid anions such as thiocyanate, formate, acetate, chloride and sulfate with an alkanolamine, in this instance, ethanolamine. The solution which has been heated by steam stripping to remove heat-unstable alkanolamine salts is passed through line 2 into a cooler 4 where the solution is reduced in temperature to between about 90° F. and about 105° F. to protect the ion exchange material contained in exchangers 6 and 26. After cooling, the mixture is introduced to anion exchanger 6 which contains a strong base anion exchange resin having an affinity for thiocyanate anions as compared to the other anions, in this instance a Type I strong base anion exchange resin, which is preferred. In exchanger 6, hydroxide ions attached to cationic sites on the resin are displaced preferentially by the thiocyanate anions contained in the ethanolamine salts. The hydroxide ions accept protons from the protonated amine, producing water and amine (e.g., AAmine $H^+A^-$ +Resin-OH→AAmine+Resin- $-A+H_2O$. Alkanolamine solution leaving the bottom of exchanger 6 is introduced through line 22 to anion exchanger 26 which contains a strong base anion exchange resin having an affinity for the other anions contained in the alkanolamine solution, in this instance a Type II strong base anion exchange resin, which is preferred. The resin in exchanger 26 also has an affinity for thiocyanate anions, but is not exposed to thiocyanate because of its removal in exchanger 6. In exchanger 26 the formate, acetate, and other anions are preferentially removed from the ethanolamine salts of such anions. Again, the hydroxide ions attached to the cationic sites on the resin are displaced by the various anions. The hydroxide ions neutralize protonated ethanolamine forming water and amine.

Part of the alkanolamine solution leaving the bottom of exchanger 6 is passed through line 8 into container 10 which contains a conductance probe 12. At least part of the alkanolamine solution entering container 10 contacts conductance probe 12. Alkanolamine solution exits container 10 through line 24 and line 22 and is introduced to exchanger 26. While the drawing shows only a portion of the alkanolamine solution passing through the conductance probe, if desired the conductance probe may be placed in line 52, thus eliminating the need for lines 8 and 24. The conductance probe is connected through 14 to a conductance meter 16 which in turn is connected through 18 to a conductance recorder 20, the output of which is a conductance trace.

Figure 2:
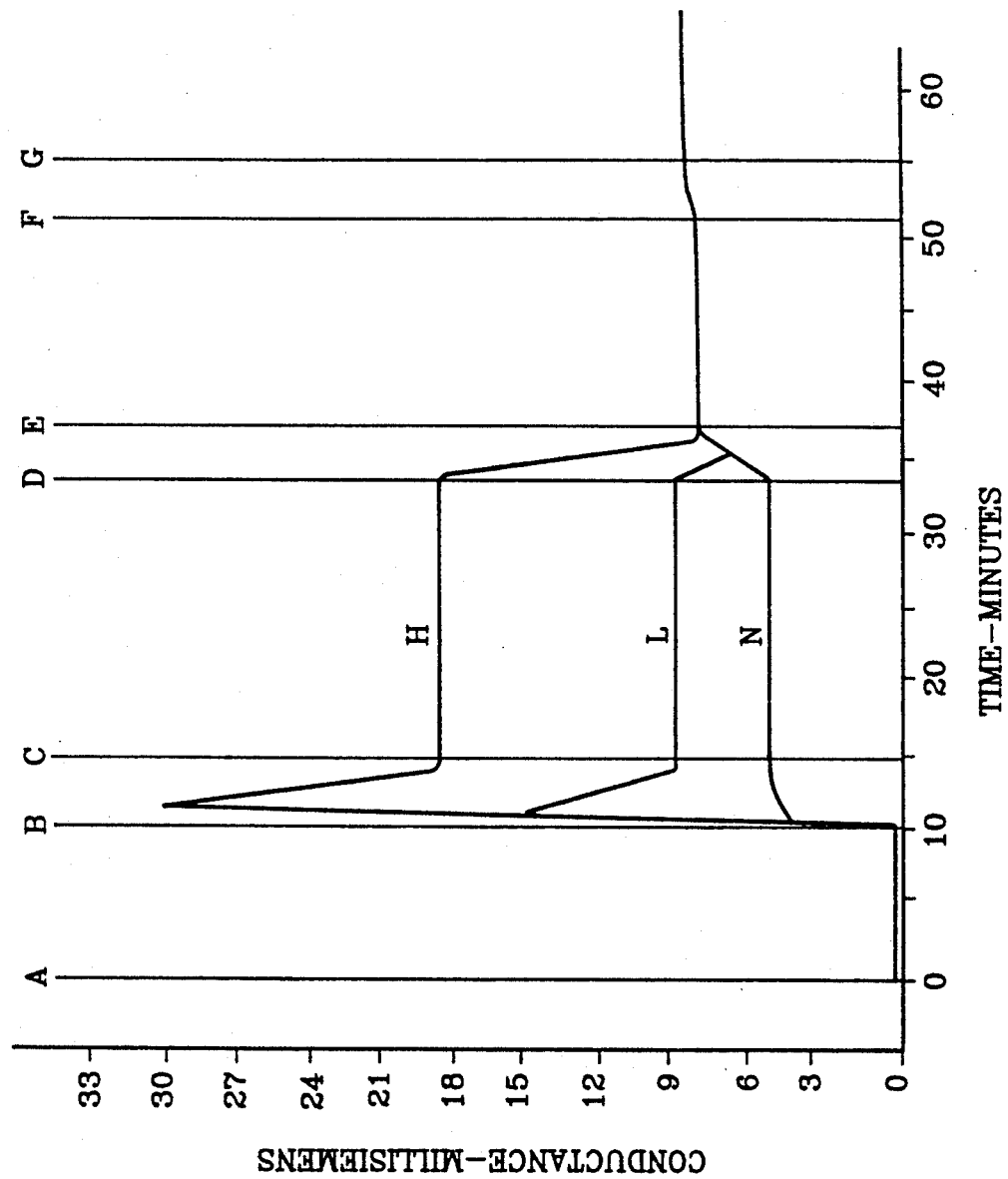
FIG. 2 shows conductance traces (conductance plotted versus time) of an alkanolamine solution containing stronger acid and weaker acid anions being passed through a strong base anion exchange resin, including traces for various concentrations of sodium cations in the alkanolamine solution.

A typical trace for the alkanolamine solution passing through exchanger 6 is shown in the plot of FIG. 2. In this figure the conductance of the alkanolamine solution is plotted with time to provide a picture of what is taking place within exchanger 6. In the portion of the plot from A to B the exchanger is being filled with alkanolamine solution. Usually the column is rinsed with water prior to the introduction of the alkanolamine solution. The portion of the trace from B to C shows the transition from water to alkanolamine solution in the effluent from the exchanger. The portion of the trace from C to D illustrates the production of alkanolamine solution which is free from both stronger and weaker acid anions. At point D on the trace, the weaker acid anions break through from the ion exchange resin. From D to E there is a transition from alkanolamine solution free from anions to alkanolamine solution containing weaker acid anions. Flow of alkanolamine solution containing weaker acid anions continues until point F at which point the stronger acid anions break through from the ion exchange resin. From F to G there is a transition from alkanolamine solution free from strong acid ions to alkanolamine solution burdened with strong acid anions. After G, the alkanolamine solution has essentially the same composition as the inlet to the anion exchange column. Since the purpose of the first anion exchange column is to remove strongly acid anions such as thiocyanate from the alkanolamine solution, the resin is removed from service just after time "F" and the resin is then ready for regeneration.

Returning to FIG. 1, as pointed out previously, the weaker acid anions are removed in the alkanolamine solution in exchanger 26. Effluent from this exchanger is passed through line 28 into 32 which comprises a conductance probe, a conductance meter, and a conductance trace recorder similar to those previously described in the discussion of the effluent from exchanger 6. Here again if desired only a portion of the effluent from exchanger 26 may be passed into 32 with the remainder being withdrawn from the unit through line 30. The effluent leaving 32 exits through line 34 and is combined with effluent from exchanger 26 in line 30.

Figure 3:
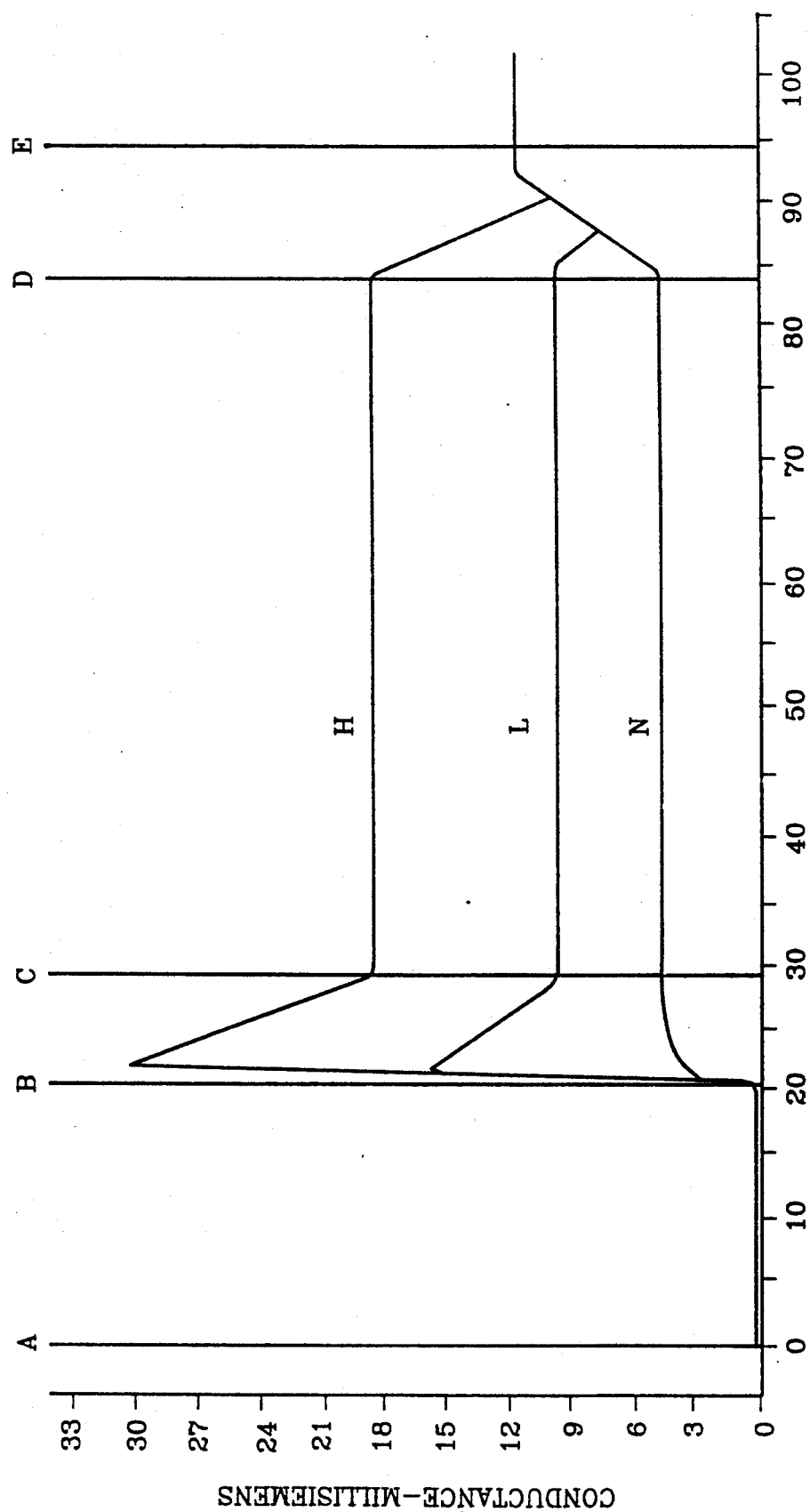
FIG. 3 shows conductance traces (conductance plotted versus time) of an alkanolamine solution containing primarily weaker acid anions being passed through a strong base anion exchange resin, including traces for various concentrations of sodium cations in the alkanolamine solution.

A typical trace obtained in recording the conductance of the effluent from exchanger 26 is shown in FIG. 3 wherein conductance is again plotted versus time as the alkanolamine solution leaves the exchanger. Referring to FIG. 3, the time period A to B represents the time during which the exchanger is being filled with amine. The transition from water to amine solution in the effluent from the exchanger occurs from B to C. From C to D the exchanger produces alkanolamine solution which is substantially free of the weaker acid anions contained in the feed solution to the column. Time D represents the point at which weaker acid anions break through the ion exchange column. From D to E there is a transition from alkanolamine solution free from weaker acid anions to an amine solution burdened with weaker acid anion. After E, the burdened amine is of essentially the same composition as the amine solution entering exchanger 26. Since the purpose of the second anion exchange resin column 26 is to remove the weaker acid anions from the alkanolamine solution, the column is removed from service just after time D and the ion exchange resin is ready for regeneration.

While exchanger 6 and 26 are shown as single vessels, if desired two or more exchangers may be used in each service and may be placed either in series or in parallel arrangement. Thus, when flow of alkanolamine solution to exchanger 6 is terminated so that this exchanger can be regenerated, the alkanolamine solution may be directed through line 21 to another strong base anion exchanger which has already completed regeneration. Similarly, the feed to anion exchanger 26 when terminated may be directed through line 33 to an already regenerated exchanger. In this manner flow of alkanolamine solution to the process may be carried out on a continuous basis by appropriate switching of exchangers from one service to another. Control of the operation of the exchangers may be carried out manually or if desired, the switching may be made automatically. For example, in FIG. 1, a signal may be transmitted from trace recorder 20 to line 2 at the appropriate time in the cycle to control switching of valves so that the flow of alkanolamine solution into exchange 6 is discontinued and the flow is shunted to line 21. Similar automatic control of exchanger 26 may be effected by a signal from 32 through 33 to line 22 in the feed to the this exchanger.

In the arrangement of FIG. 1, preferably, a sufficient amount of the Type II strong base anion exchange resin is provided in exchanger 26 so that substantially all of the weaker acid anions taken up by this resin are removed from the alkanolamine solution before break through of thiocyanate from exchanger 6 occurs. In this process arrangement break through of thiocyanate anions from exchanger 6 occurs prior to break through of weaker acid anions from exchanger 26. If this procedure is followed, it is not necessary to control switching of the alkanolamine amine feed solution entering exchanger 26 since the feed to both exchanger 6 and 26 is switched at the same time. It still may be desirable, however, to monitor the effluent from exchanger 26 to guard against any unforeseen break through of solution containing weaker acid anions which would contaminate the reactivated alkanolamine solution. Of course, if a plurality of exchangers are employed in the process so that the process may be carried out with a continuous flow of alkanolamine solution, the amount of resin provided in each exchanger may be varied as desired since regenerated exchangers are always available for transfer of the effluent from the exchangers requiring regeneration.

Figure 4:
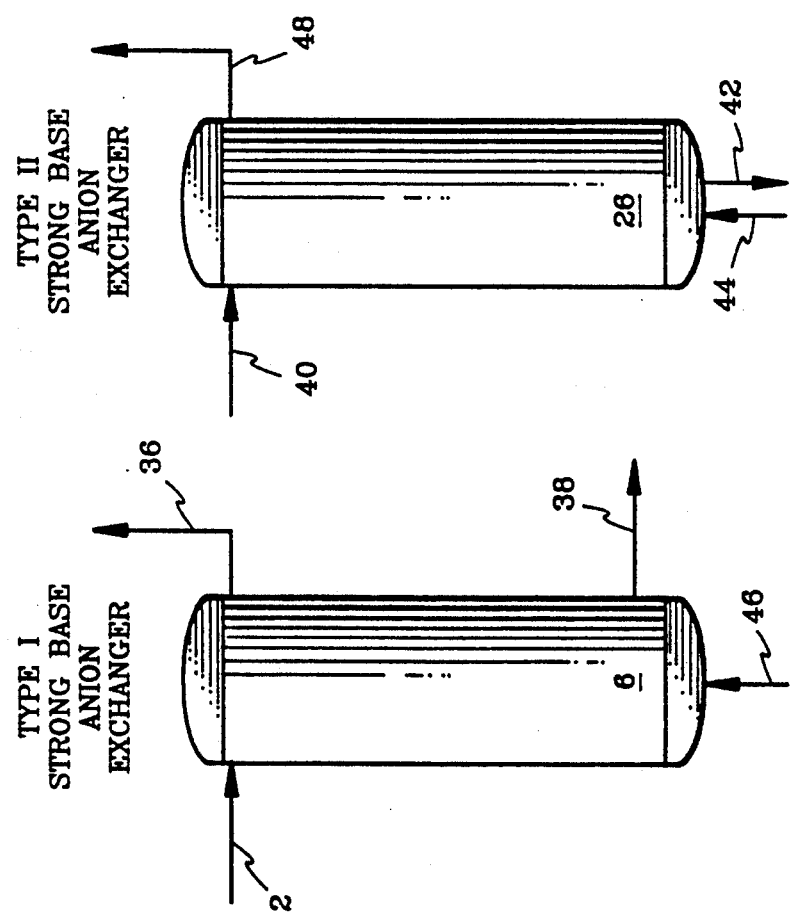
FIG. 4 is a schematic process flow diagram which illustrates regeneration of the anion exchange resins of the process of FIG. 1.

After flow of alkanolamine solution to exchangers 6 and 26 is discontinued, the exchange resins are regenerated, the procedure for which is illustrated in FIG. 4. To initiate regeneration, water is passed through the Type I strong base anion exchanger 6 via line 2 and is removed through line 38. The purpose of the water wash is to flush the exchanger of all ethanolamine. If desired, the water introduced through line 2 may be allowed to pass sequentially (not shown) through both exchanger 6 and 26 exiting from exchanger 26 through line 42.

After the ethanolamine is flushed from the ion exchange resin bed, exchanger 6 is eluted with sulfuric acid which is introduced to exchanger 6 through line 46 and exits through line 36. Flow of sulfuric acid through the exchanger is continued until substantially all of the thiocyanate anions in the exchanger have been replaced with sulfate ions.

Since flow of alkanolamine solution through exchanger 6 is discontinued when thiocyanate appears in the effluent from the exchanger, the amount of thiocyanate contained in the lower portion of the exchanger may be much less than it is in the upper portion. Accordingly, there may be a gradation in the amount of thiocyanate through exchanger 6, varying from a very high concentration at the top of the exchanger to a low concentration at the bottom. Because of this gradation, it is preferable to elute the exchanger with sulfuric acid in a flow countercurrent to the flow of the alkanolamine solution. Thus, in FIG. 4, sulfuric acid is introduced to the bottom of exchanger 6 and removed from the top of the exchanger. With this type of operation, the high concentration of thiocyanate is not pushed through the exchanger by the acid, but rather is removed from the exchanger at the end where it's concentration is greatest. While it is not preferred, concurrent flow of sulfuric acid through the exchanger may be used; however, such an operation will probably require substantially more sulfuric acid to effect the same result.

After the thiocyanate is removed from exchanger 6, the exchanger is rinsed with water to remove residual acid and then is flushed preferably with countercurrent flow by introducing an alkali metal hydroxide, in this instance sodium hydroxide, through line 46 to replace the sulfate ions on the resin with hydroxide ions. The resulting sodium sulfate is removed overhead from exchanger 6 through line 36. When substantially all of the sulfate ions have been removed, exchanger 6 is again washed with water which may be introduced through line 2 and removed through line 38 or introduced via line 46 and removed through line 36. After completion of this washing step, the Type I strong base anion exchange resin is ready for reuse and introduction of the ethanolamine solution may be resumed as illustrated in FIG. 1.

The sulfuric acid which is used in the regeneration process of the invention is effective in removing the thiocyanate, because it converts the thiocyanate to thiocyanic acid and thereby prevents ion exchange of the thiocyanate with the resin during regeneration. It is this property of the sulfuric acid solution which makes it possible to effect substantially complete removal of thiocyanate from the strong base anion exchange resin. The sulfuric acid used in the regeneration process usually has an acid concentration (based on the total water and acid present) between about 10 and about 20 weight percent and preferably between about 13 and about 17 weight percent. While the acid may be used at room temperature, it is preferred to use warm acid, usually having a temperature between about 90° F. and about 140° F. The amount of acid used in the regeneration step will depend on the strength of the acid and the amount of thiocyanate deposited on the Type I strong base anion exchange resin. Usually between about 85 and about 100 pounds of acid will be used per cubic foot of resin to effect complete regeneration of the resin.

The alkali metal hydroxide which is used to complete the regeneration process by removal of the sulfate ion from the Type I strong base anion exchange resin is preferably sodium hydroxide; however, other alkali metal hydroxides such as potassium hydroxide or lithium hydroxide may also be used. Here again, the alkali metal hydroxide may be used at room temperature; however, higher temperatures are preferred usually between about 90° F. and about 140° F.. The alkali metal hydroxides used in the regeneration process will usually have a metal hydroxide concentration (based on the total water and hydroxide present) of between about 10 and about 25 weight percent and preferably between about 10 and about 15 weight percent. Depending on the concentration of the alkali metal hydroxide and the amount of sulfate on the resin, the quantity of alkali metal hydroxide used in the regeneration will vary from about 30 to about 40 pounds NaOH equivalent per cubic of the Type I strong base anion exchange resin.

Returning now to FIG. 4, it is necessary to regenerate the Type II strong base anion exchanger 26 which is contaminated with formate, acetate, and other anions released from the heat-stable ethanolamine salts. Prior to regeneration, it is desirable to wash exchanger 26 with water introduced through line 40 and exiting line 42 to remove ethanolamine from the resin. The resin is then contacted, preferably countercurrently by introducing an alkali metal hydroxide, e.g., sodium hydroxide, to exchanger 26 through line 44 to replace anions on the resin with hydroxide anions. As the sodium salts of the anions are formed, they are removed overhead from exchanger 26 through line 48. The alkali metal hydroxides which may be used, the concentration of these materials and temperature of use are the same as those described for the regeneration of the Type 1 strong base anion exchange resin. In the regeneration of exchanger 26, the amount of alkali metal hydroxide used will usually be between about 10 and about 15 pounds NaOH equivalent per cubic feet of Type II strong base anion exchange resin.

In one aspect of the invention, the alkanolamine solution which is to be reactivated contains sodium salts of the thiocyanate, formate, acetate, and other anions which form heat-stable salts with the alkanolamine. Sodium ions must be removed from the ethanolamine solution to maintain the heat-stable salt and ion-removal capability in the anion exchangers. If sodium is allowed to remain in solution, hydroxide ions which are exchanged for other anions will also remain in solution. As hydroxide ion concentration increases in the solution, the driving force for the exchange of anions from the solution with $OH^-$ on the resin decreases, and exchanger efficiency decreases. Elevated hydroxide concentration can reverse the desired exchange, reintroducing anions into the alkanolamine solution.

Figure 5:
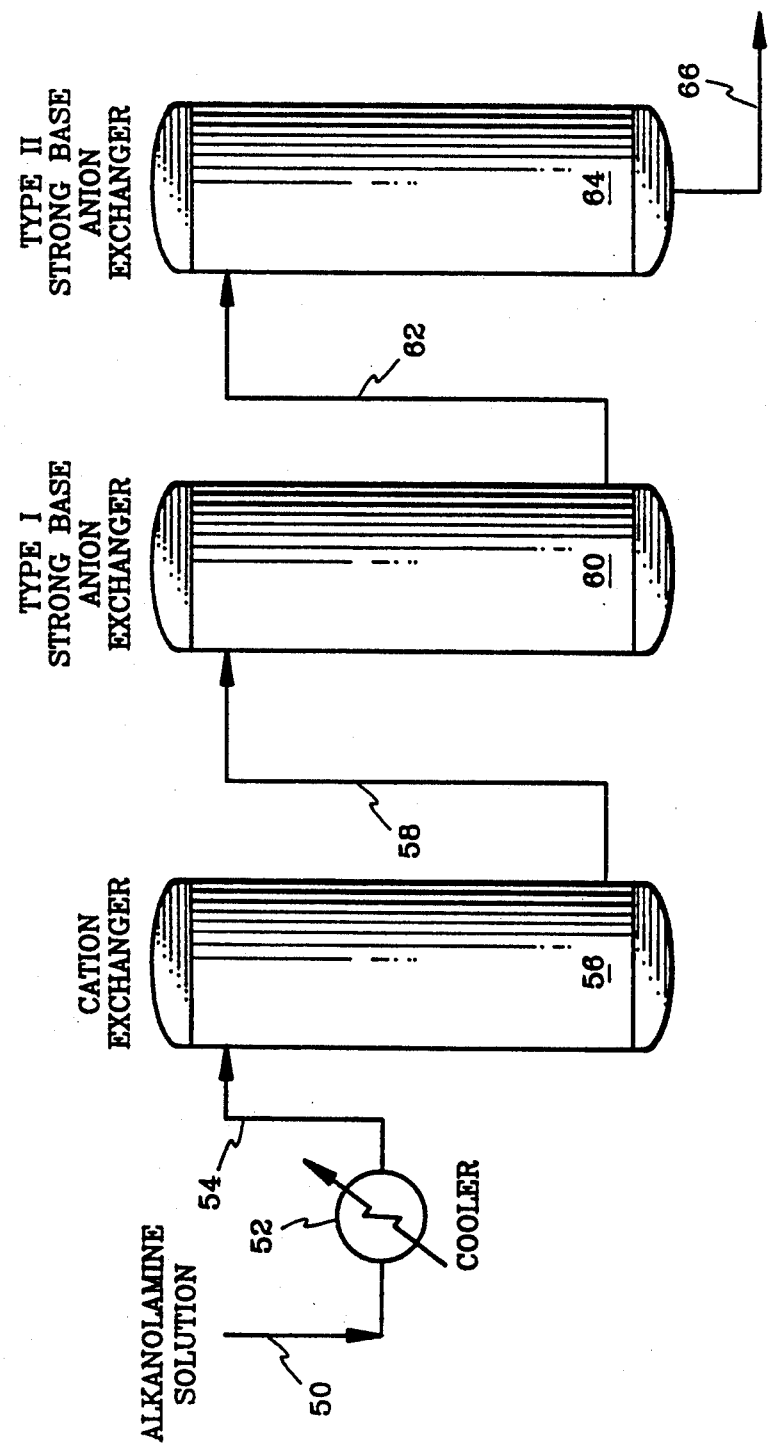
FIG. 5 is a schematic process flow diagram which illustrates another embodiment of the invention in which alkanolamine solution is first passed through a cation exchange resin and then through two strong base anion exchange resins in sequence.
Figure 6:
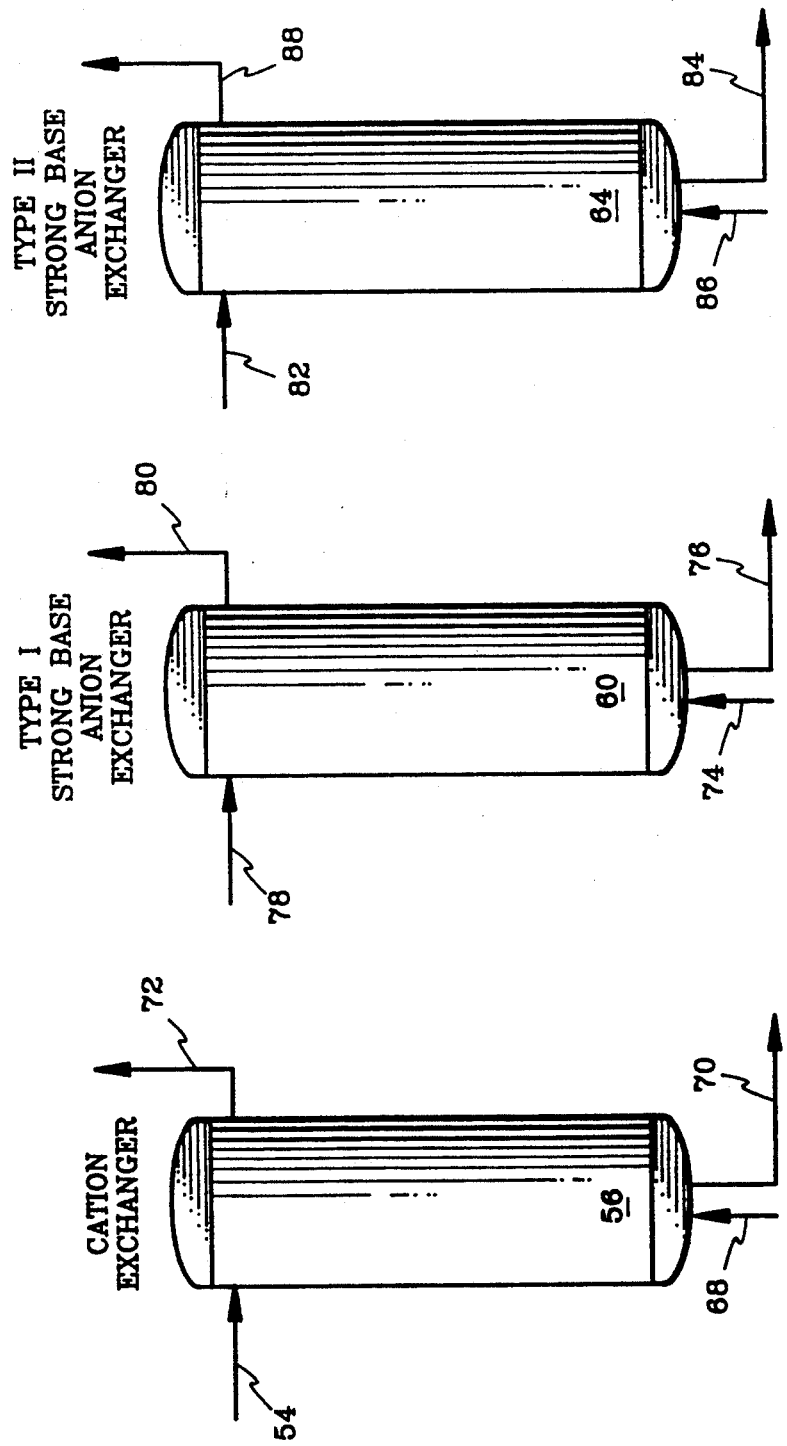
FIG. 6 is a schematic process flow diagram which illustrates the regeneration of the anion and cation exchange resins of FIG. 5.

Removal of the sodium ions from the alkanolamine solution and the subsequent regeneration steps required are illustrated in FIGS. 5 and 6. Referring now to FIG. 5, alkanolamine solution containing sodium salts of anions (thiocyanate, etc.) is introduced through line 50 into a cooler 52 where the solution is reduced to a temperature between about 90° F. and about 105° F. to protect the ion exchange material contained in exchangers 56, 60 and 64. After cooling, the solution is introduced through line 54 to cation exchanger 56 which preferably contains a weak acid cation exchange resin. In the cation exchanger, the hydrogen ions attached to the anionic sites on the resin are displaced by the sodium contained in the solution. The hydrogen ions protonate ethanolamine, which replaces sodium as the cation in the solution. The ethanolamine solution containing the heat-stable salts then leaves the cationic exchanger and passes through lines 58 and 62 sequentially contacting the Type I strong base anion resin in exchanger 60 and the Type II strong base anion resin in exchanger 64, as in the process described in FIG. 1. Thiocyanate is preferentially removed in exchanger 60 and the remaining anions, formates, acetates, etc., are removed in exchanger 64. The alkanolamine solution, now free of sodium and anions, may be recycled for reuse through line 66.

Periodically, the exchange resins used in the process illustrated by FIG. 5 will require regeneration, a procedure for which is illustrated in FIG. 6. As the first step in the regeneration, flow of ethanolamine solution to cation exchanger 56 through lines 50 and 54 is halted and water is introduced to this exchanger to flush the exchanger of all ethanolamine. The water may be introduced to exchanger 56 through line 54 and removed through line 70. Although not shown, the flow of water may be continued from exchanger 56 through anion exchanger 60 and anion exchanger 64 for the same purpose. In this case, water containing ethanolamine would be removed from the exchanger 64 through line 84. After the ethanolamine is flushed from the cation exchange resin bed, the cation exchanger 56 is eluted with a mineral acid through lines 68 and 72 to replace sodium ions in the ion exchange resin with hydrogen ions. Usually either hydrochloric acid or sulfuric acid are used for this purpose, in concentrations ordinarily containing from about 5 to about 25 weight percent acid. After elution, cation exchanger 56 may be again washed with water to remove residual acid. This wash step may be carried out either through lines 54 and 70 or lines 68 and 72.

In the described process, alkanolamine in the alkanolamine solution is protonated by hydrogen at the ionic sites on the cation exchange resin and becomes attached to these sites as alkanolamine cations. When the cation exchange resin is regenerated with mineral acid, both the alkali metal cation and such alkanolamine are displaced from the resin with hydrogen ions taking their place. The alkanolamine in the regenerant stream cannot be returned for reuse in the alkanolamine treating process because the alkali metal and conjugate base ions of the acid in the regenerant would recontaminate the system. This loss of alkanolamine may be avoided by altering the regeneration procedure. In this altered procedure, the cation exchange resin containing alkali metal cations and alkanolamine cations is regenerated by initially eluting the resin with an aqueous ammonia solution which preferentially displaces the alkanolamine from the resin with minimal displacement of alkali metal cations. The effluent from the cation exchanger 56 may be further processed to separate ammonia and alkanolamine, both of which are reused in the alkanolamine treating process. Thereafter, the resin is eluted with mineral acid to displace the ammonia, alkali metal cations and any remaining alkanolamine from the resin. Again, preferably the resin is washed with water before and after each of the elution steps. The aqueous ammonia solution used in this aspect of the process may vary in concentration; however, usually the ammonia will constitute between about 5 weight percent and about 25 weight percent of the solution and preferably between about 10 and about 15 weight percent. The concentration of the mineral acid used after the ammonia elution will also be between about 5 weight percent and about 25 weight percent and preferably between about 10 and about 15 weight percent.

The regeneration of the Type I strong base anion exchanger 60 is carried out in the same manner as described in the discussion exchanger 6 of FIG. 4. Here again, the elution with strong sulfuric acid followed by sodium hydroxide elution is preferably carried out countercurrent to the flow of the alkanolamine solution through this exchanger, i.e., through lines 74 and 80. The regeneration of the Type II strong base anion exchange resin in exchanger 64 is also carried out in the same manner as described in the discussion of exchanger 26 in FIG. 4.

The quantities of the various regenerant streams i.e. alkali metal hydroxide, mineral acid and water employed in carrying out the process will depend on the amount of the ion exchange resin used and the composition of the alkanolamine solution being reactivated. The amounts of alkali metal hydroxide and mineral acid used will also vary depending on the concentration of these materials. The quantities and the flow rates of each material employed are readily determined for each operation within the skill of the art.

Each of FIGS. 2 and 3 containing three conductance traces labeled N, H and L respectively. The trace marked N is typical of amine solutions in which there is essentially no sodium hydroxide. Such solutions will usually contain an amount of sodium hydroxide which ranges from 0 to less than 100 parts per million. The curve marked L is typical of amine solutions containing a low level of sodium hydroxide usually from about 100 parts per million up to as high as 2000 parts per million. As noted in the previous discussion, the alkanolamine solutions which required regeneration often contain sodium salts of various anions. Sodium cations are ordinarily removed by passing the solution in contact with a cation exchange resin. While care is exercised to remove all of the sodium ion from the alkanolamine solution, in some instances small amounts of sodium may remain in the alkanolamine solution when it is contacted with the Type I and Type II strong base anion exchange resins.

It is noted in both FIGS. 2 and 3 that the general shape of trace L is the same as trace N but the shape differs from B to C and from D to E and the level between times C and D is higher. These differences result from the presence of the sodium cation in the solution. Referring to curve L in FIG. 3, the anion exchange resin removes anions and introduces the much more conductive $OH^-$ anions into the solution in an amount equivalent to the sodium cation concentration. This amount of $OH^-$ anions is called excess $OH^-$. Conductance rises sharply from time B as amine and excess $OH^-$ begin to replace water in the effluent from the exchanger. As the amine concentration in the effluent rises, however, the equivalent conductance of the $OH^-$ decreases somewhat and the total conductance drops again. By time C the total amine and excess $OH^-$ concentrations in the effluent stabilize and the conductance of the $OH^-$ plus the anion free amine solution is a constant until time D. As the capacity of the anion exchange resin is reached (time D) anions increase in the effluent and the $OH^-$ concentration decreases. The net effect is a drop in the conductance of the solution until the $OH^-$ concentration decreases to about zero. Then the conductances increases until at time E the composition of the effluent approximates that of the amine solution introduced to the exchanger.

The trace marked H in FIG. 3 is typical of an amine solution containing a higher level of sodium hydroxide above about 2,000 parts per million. The explanation of the shape of trace H is the same as that for trace L. The conductance magnitudes are higher because of the higher concentration of OH. balancing the higher sodium cation content.

A very large sodium cation concentration in the alkanolamine solution can adversely affect the capacity of the strong base anion exchange resin. For example, when a alkanolamine solution containing 9,000 parts per million of sodium cation was contacted with a Type II strong base anion exchange resin, the time between points and C and D shrank to nothing. The excess OH competed successfully with the weaker acid anions for sites on the ion exchange resin resulting in weaker acid anion breakthrough beginning at time C. The conductance continually decreased and the weaker acid anion concentration increased from that point.

FIG. 2 also contains three traces reflecting different levels of sodium content in the alkanolamine solution. The traces in FIG. 2 are similar to those shown in FIG. 3 and are explained in the same manner as the traces of FIG. 3.

The invention has been specifically described in its application to the use of ethanolamine, however, any of the other common alkanolamines previously mentioned may be used in the process.

A variety of ion exchange resins may be used in the process of the invention. Strong base anion exchange resins are characterized as having fixed tertiary amine anion exchange sites which are positively charged at any pH. Weak base anion exchange resins have fixed primary or secondary amine anion exchange sites. The sites are positively charged depending on the pH of the solution. At higher pH the sites are neutral.

Type I resins are those which contain amine groups. Type II resins contain alkanolamine groups. Examples of strong base Type I anion exchange resins are styrene-divinylbenzene resins with quaternary ammonium groups attached to the polymer framework, such as Resintech TM SBG-1 and Sybron TM ASB-1, sold by Resintech Company. Strong base Type II anion exchange resins include styrene-divinylbenzene resins with quaternary alkanolamine groups attached to the polymer framework, such as Resintech TM SBG-II and Sybron TM ASB-II, also available from Resintech Company.

Other resins which may be used include such materials as Bayer AG's Mobay TM M500, a Type I strong base anion exchange resin which is a polystyrene resin with quaternary ammonium groups attached to the polymer framework; Rohm and Haas Amberlyst TM A-26, a Type I strong base anion exchange resin, which is a styrene-divinylbenzene copolymer with quaternary ammonium groups attached to the polymer framework and Rohm and Haas Amberlite TM IRA-410, a Type II strong base amine-type anion exchange resin. Also included are Dow styrene-divinylbenzene strong base anion exchange resins having quaternary amines as their functional group. These materials are available under the DOWEX trademark.

Cation exchange resins which may be used include such materials as Rohm and Haas Amberlite TM IRC-50, a weak acid cation exchange resin, which is a methacrylic acid-divinylbenzene copolymer with carboxylic acid functional groups attached to the polymer framework; Rohm and Haas Amberlyst TM A-15, a strong acid cation exchange resin, which is a styrene-divinylbenzene copolymer resin with sulfonic acid groups attached to the polymer framework; and Rohm and Haas Amberlite TM IR-120, a strong acid cation exchange resin which is a sulfonic styrene-divinylbenzene copolymer.

The preceding resins are merely illustrative of useful ion exchange resins and are not intended to limit the resins which may be used in carrying out the process of the invention.

While certain embodiments and details have been shown for the purpose of illustrating the present invention, it will be apparent to those skilled in the art that various changes and modifications may be made herein without departing from the spirit or scope of the invention.

We claim:

1. A process for the reactivation of an alkanolamine solution containing heat-stable salts of an alkanolamine in the solution with stronger acid anions and weaker acid anions, which comprises:
    (a) contacting a stream of alkanolamine solution in a first zone with a strong base anion exchange resin which has a high affinity for stronger acid anions
    (b) contacting the effluent alkanolamine solution from the first zone in a second zone with a strong base anion exchange resin which has an affinity for weaker acid anions
    (c) measuring and recording the electrical conductance of the effluent alkanolamine solution from the first zone
    (d) removing the first zone from service when the conductance of the effluent alkanolamine solution from said first zone indicates break through of stronger acid anions in said effluent
    (e) measuring and recording the electrical conductance of the effluent alkanolamine solution from the second zone
    (f) removing the second zone from service when the conductance of the effluent alkanolamine solution from said second zone indicates break through of weaker acid anions in said effluent and
    (g) regenerating the strong base anion exchange resin in both zones.

2. The process of claim 1 in which the stronger acid anions are selected from the group consisting of $SCN^-$, $Cl^-$ and $SO_4^=$ and the weaker acid anions are selected from the group of acid gases and anions consisting of $SO_2$, $COS$, $HCN$, $S_2O_3^=$, $HCO_2^-$ and $CH_3CO_2^-$.

3. The process of claim 2 in which the alkanolamine is selected from the group consisting of ethanolamine, diethanolamine, methyldiethanolamine, diisopropanolamine and triethanolamine.

4. The process of claim 3 in which
    a) the strong base anion exchange resin in the first zone is regenerated by contacting it with sulfuric acid to effect removal of stronger acid anions from the resin followed by contacting said resin with an alkali metal hydroxide to remove sulfate anions from the resin
    b) the strong base anion exchange resin in the second zone is regenerated by contacting it with an alkali metal hydroxide to remove the weaker acid anions from the resin.

5. The process of claim 1 in which the process is carried out continuously by providing additional first and second zones whereby the flow of alkanolamine solution feed may be transferred to zones containing regenerated resins while resins in other zones are undergoing regeneration.

6. A process for the reactivation of an alkanolamine solution containing heat stable salts of an alkanolamine in the solution with stronger acid anions and weaker acid anions, which comprises:
    (a) contacting a stream of alkanolamine solution in a first zone with a Type I strong base anion exchange resin which has a high affinity for stronger acid anions
    (b) contacting the effluent alkanolamine solution from the first zone in a second zone with a Type II strong base anion exchange resin which has an affinity for weaker acid anions
    (c) measuring and recording the electrical conductance of the effluent alkanolamine solution from the first zone
    (d) removing the first zone from service when the conductance of the effluent alkanolamine solution from said first zone indicates break through of stronger acid anions in said effluent (e) measuring and recording the electrical conductance of the effluent alkanolamine solution from the second zone (f) removing the second zone from service when the conductance of the effluent alkanolamine solution from said second zone indicates break through of weaker acid anions in said effluent and (g) regenerating the Type I and Type II strong base anion exchange resin in both zones.

7. The process of claim 6 in which the stronger acid anions are selected from the group consisting of $SCN^-$, $Cl^-$ and $SO_4^=$
and the weaker acid anions are selected from the group of acid gases and anions consisting of $SO_2$, $COS$, $HCN$, $S_2O_3^=$, $HCO_2^-$ and $CH_3CO_2^-$.

8. The process of claim 7 in which the alkanolamine is selected from the group consisting of ethanolamine, diethanolamine, methyldiethanolamine, diisopropanolamine and triethanolamine.

9. The process of claim 8 in which
a) the Type I strong base anion exchange resin is regenerated by contacting it with sulfuric acid to effect removal of stronger acid anions from the resin followed by contacting said resin with an alkali metal hydroxide to remove sulfate anions from the resin
b) the Type II strong base anion exchange resin is regenerated by contacting it with an alkali metal hydroxide to remove the other anions from the resin.

10. The process of claim 6 in which the process is carried out continuously by providing additional first and second zones whereby the flow of alkanolamine solution feed may be transferred to zones containing regenerated resins while resins in other zones are undergoing regeneration.

11. A process for the reactivation of an alkanolamine solution containing heat stable salts of an alkanolamine in the solution with thiocyanate anions and other anions which form such heat-stable salts, which comprises:
(a) contacting a stream of alkanolamine solution in a first zone with a Type I strong base anion exchange resin which has a high affinity for thiocyanate anions are compared to the other anions
(b) contacting the effluent alkanolamine solution from the first zone in a second zone with a Type II strong base anion exchange resin which has an affinity for the other anions
(c) measuring and recording the electrical conductance of the effluent alkanolamine solution from the first zone
(d) removing the first zone from service when the conductance of the effluent alkanolamine solution from said first zone indicates break through of thiocyanate anions in said effluent
(e) measuring and recording the electrical conductance of the effluent alkanolamine solution from the second zone
(f) removing the second zone from service when the conductance of the effluent alkanolamine solution from said second zone indicates break through of the other anions in said effluent and
(g) regenerating the Type I and Type II strong base anion exchange resin in both zones.

12. The process of claim 11 in which the alkanolamine is selected from the group consisting of ethanolamine, diethanolamine, methyldiethanolamine, diisopropanolamine and triethanolamine.

13. The process of claim 12 in which
a) the Type I strong base anion exchange resin is regenerated by contacting it with sulfuric acid to effect removal of thiocyanate anions from the resin followed by contacting said resin with an alkali metal hydroxide to remove sulfate anions from the resin
b) the Type II strong base anion exchange resin is regenerated by contacting it with an alkali metal hydroxide to remove the other anions from the resin.

14. The process of claim 11 in which the process is carried out continuously by providing additional first and second zones whereby the flow of alkanolamine solution feed may be transferred to zones containing regenerated resins while resins in other zones are undergoing regeneration.

15. A process for the reactivation of an alkanolamine solution containing alkali metal salts of stronger acid anions and weaker acid anions which form heat-stable salts with alkanolamines which comprises:
(a) contacting the alkanolamine solution in a first zone with a cation exchange resin to remove alkali metal cations from the solution, whereby the stronger acid anions and weaker acid anions form heat-stable salts with the alkanolamine
(b) contacting the effluent alkanolamine solution from the first zone in a second zone with a strong base anion exchange resin which has a high affinity for stronger acid anions
(c) contacting the effluent alkanolamine solution from the second zone in a third zone with a strong base anion exchange resin which has an affinity for weaker acid anions
(d) measuring and recording the electrical conductance of the effluent alkanolamine solution from the second zone
(e) removing the second zone from service when the conductance of the effluent alkanolamine solution from said second zone indicates break through of stronger acid anions in said effluent
(f) measuring and recording the electrical conductance of the effluent alkanolamine solution from the third zone
(g) removing the third zone from service when the conductance of the effluent alkanolamine solution from said third zone indicates break through of weaker acid anions in said effluent and
(h) regenerating the cation exchange resin and the strong base anion exchange resins.

16. The process of claim 15 in which the stronger acid anions are selected from the group consisting of $SCN^-$, $Cl^-$ and $SO_4^=$ and the weaker acid anions are selected from the group of acid gases and anions consisting of $SO_2$, $COS$, $HCN$, $S_2O_3^=$, $HCO_2^-$ and $CH_3CO_2^-$.

17. The process of claim 16 in which the alkanolamine is selected from the group consisting of ethanolamine, diethanolamine, methyldiethanolamine, diisopropanolamine and triethanolamine.

18. The process of claim 17 in which
a) the cation exchange resin is regenerated by contacting it with a mineral acid to remove alkali metal cations from the resin
b) the first mentioned strong base anion exchange resin is regenerated by contacting it with sulfuric acid to effect removal of stronger acid anions from the resin followed by contacting said resin with an alkali metal hydroxide to remove sulfate anions from the resin c) the second mentioned strong base anion exchange resin is regenerated by contacting it with an alkali metal hydroxide to remove the weaker acid anions from the resin.

19. The process of claim 15 in which the process is carried out continuously by providing additional first, second and third zones whereby the flow of alkanolamine solution feed may be transferred to zones containing regenerated resins while resins in other zones are undergoing regeneration.

20. A process for the reactivation of an alkanolamine solution containing alkali metal salts of thiocyanate anions and other anions which form heat-stable salts with alkanolamines which comprises:

(a) contacting the alkanolamine solution in a first zone with a cation exchange resin to remove alkali metal cations from the solution, whereby the stronger acid anions and weaker acid anions form heat-stable salts with the alkanolamine (b) contacting the effluent alkanolamine solution from the first zone in a second zone with a strong base anion exchange resin which has a high affinity for thiocyanate anions as compared to the other anions (c) contacting the effluent alkanolamine solution form the second zone in a third zone with a Type II strong base anion exchange resin which has an affinity for the other anions (d) measuring and recording the electrical conductance of the effluent alkanolamine solution from the second zone (e) removing the second zone from service when the conductance of the effluent alkanolamine solution from said second zone indicates break through of stronger acid anions in said effluent (f) measuring and recording the electrical conductance of the effluent alkanolamine solution from the third zone (g) removing the third zone from service when the conductance of the effluent alkanolamine solution from said third zone indicates break through of other anions in said effluent and (h) regenerating the cation exchange resin and the Type I and Type II strong base anion exchange resins.

21. The process of claim 20 in which the stronger acid anions are selected from the group consisting of $SCN^-$, $Cl^-$ and $SO^=_4$ and the weaker acid anions are selected from the group of acid gases and anions consisting of $SO_2$, COS, HCN, $S_2O^=_3$, $HCO^-_2$ and $CH_3CO^-_2$.

22. The process of claim 21 in which the alkanolamine is selected from the group consisting of ethanolamine, diethanolamine, methyldiethanolamine, diisopropanolamine and triethanolamine.

23. The process of claim 22 in which a) the cation exchange resin is regenerated by contacting it with a mineral acid to remove alkali metal cations from the resin b) the first mentioned strong base anion exchange resin is regenerated by contacting it with sulfuric acid to effect removal of stronger acid anions from the resin followed by contacting said resin with an alkali metal hydroxide to remove sulfate anions from the resin c) the second mentioned strong base anion exchange resin is regenerated by contacting it with an alkali metal hydroxide to remove the weaker acid anions from the resin.

24. The process of claim 20 in which the process is carried out continuously by providing additional first, second and third zones whereby the flow of alkanolamine solution feed may be transferred to zones containing regenerated resins while resins in other zones are undergoing regeneration.

25. A process for the reactivation of an alkanolamine solution containing heat-stable salts of an alkanolamine in the solution with stronger acid anions and weaker acid anions, which comprises:

(a) contacting a stream of alkanolamine solution in a first zone with a strong base anion exchange resin which has a high affinity for stronger acid anions (b) contacting the effluent alkanolamine solution from the first zone in a second zone with a strong base anion exchange resin which has a high affinity weaker acid anions, said anion exchange resin being present in said second zone in an amount sufficient to remove all of the weaker acid anions from the alkanolamine solution prior to break through of stronger acid anions in step (d)

(c) measuring and recording the electrical conductance of the effluent alkanolamine solution from the first zone (d) removing the first zone from service when the conductance of the effluent alkanolamine solution from said first zone indicates break through of stronger acid anions in said effluent (e) measuring and recording the electrical conductance of the effluent alkanolamine solution from the second zone (f) removing the second zone from service at the same time as the first zone and (g) regenerating the strong base anion exchange resin in both zones.

26. The process of claim 25 in which the stronger acid anions are selected from the group consisting of $SCN^-$, $Cl^-$ and $SO^=_4$ and the weaker acid anions are selected from the group of acid gases and anions consisting of $SO_2$, COS, HCN, $S_2O^=_3$, $HCO^-_2$ and $CH_3CO^-_2$.

27. The process of claim 26 in which the alkanolamine is selected from the group consisting of ethanolamine, diethanolamine, methyldiethanolamine, diisopropanolamine and triethanolamine.

28. The process of claim 27 in which a) the strong base anion exchange resin in the first zone is regenerated by contacting it with sulfuric acid to effect removal of stronger acid anions from the resin followed by contacting said resin with an alkali metal hydroxide to remove sulfate anions from the resin b) the strong base anion exchange resin in the second zone is regenerated by contacting it with an alkali metal hydroxide to remove the weaker acid anions from the resin.

29. The process of claim 25 in which the process is carried out continuously by providing additional first and second zones whereby the flow of alkanolamine solution feed may be transferred to zones containing regenerated resins while resins in other zones are undergoing regeneration.

30. A process for the reactivation of an alkanolamine solution containing heat stable salts of an alkanolamine in the solution with thiocyanate anions and other anions which form such heat-stable salts, which comprises:
    (a) contacting a stream of alkanolamine solution in a first zone with a Type I strong base anion exchange resin which has a high affinity for thiocyanate anions as compared to the other anions
    (b) contacting the effluent alkanolamine solution from the first zone in a second zone with a Type II strong base anion exchange resin which has an affinity for the other anions, said anion exchange resin being present in said second zone an amount sufficient to remove all of the weaker acid anions from the alkanolamine solution prior to break through of stronger acid anions in step (d)
    (c) measuring and recording the electrical conductance of the effluent alkanolamine solution from the first zone
    (d) removing the first zone from service when the conductance of the effluent alkanolamine solution from said first zone indicates break through of thiocyanate anions in said effluent
    (e) measuring and recording the electrical conductance of the effluent alkanolamine solution from the second zone
    (f) removing the second zone from service at the same time as the first zone and
    (g) regenerating the Type I and Type II strong base anion exchange resins.

31. The process of claim 30 in which the alkanolamine is selected from the group consisting of ethanolamine, diethanolamine, methyldiethanolamine, diisopropanolamine and triethanolamine.

32. The process of claim 31 in which
    a) the Type I strong base anion exchange resin is regenerated by contacting it with sulfuric acid to effect removal of thiocyanate anions from the resin followed by contacting said resin with an alkali metal hydroxide to remove sulfate anions from the resin
    b) the Type II strong base anion exchange resin is regenerated by contacting it with an alkali metal hydroxide to remove the other anions from the resin.

33. The process of claim 30 in which the process is carried out continuously by providing additional first and second zones whereby the flow of alkanolamine solution feed may be transferred to zones containing regenerated resins while resins in other zones are undergoing regeneration.

* * * * *

UNITED STATES PATENT AND TRADEMARK OFFICE
CERTIFICATE OF CORRECTION

PATENT NO.  : 5,162,084
DATED       : November 10, 1992
INVENTOR(S) : Arthur L. Cummings et al It is certified that error appears in the above-identified patent and that said Letters Patent is hereby corrected as shown below:

Column 12, line 55, "OH" should be --OH$^-$--.

Column 12, line 63, "OH" should be --OH$^-$--.

Column 17, line 25, after "a", second occurrence, --Type I-- was omitted.

Column 17, line 29, "form" should be --from--.

Column 17, line 39, "stronger acid" should be --thiocyanate--.

Signed and Sealed this

Fifth Day of October, 1993

Attest:

BRUCE LEHMAN

Attesting Officer

Commissioner of Patents and Trademarks